United States Patent [19]
Deerfield et al.

[11] Patent Number: 4,959,776
[45] Date of Patent: Sep. 25, 1990

[54] METHOD AND APPARATUS FOR ADDRESSING A MEMORY BY ARRAY TRANSFORMATIONS

[75] Inventors: Alan J. Deerfield, Newport, R.I.; Sun-Chi Siu, Marlboro, Mass.

[73] Assignee: Raytheon Company, Lexington, Mass.

[21] Appl. No.: 279,607

[22] Filed: Dec. 5, 1988

Related U.S. Application Data

[62] Division of Ser. No. 135,579, Dec. 21, 1987, Pat. No. 4,819,152.

[51] Int. Cl.⁵ .............................................. G06F 12/06
[52] U.S. Cl. .................................... 364/200; 364/725; 365/230.03
[58] Field of Search .................. 364/200, 900, 724.05, 364/725–727; 365/230.03, 239

[56] References Cited

U.S. PATENT DOCUMENTS

| | | | |
|---|---|---|---|
| 4,166,289 | 8/1979 | Murtha et al. | 364/200 |
| 4,231,102 | 10/1980 | Barr et al. | 364/726 |
| 4,393,457 | 7/1983 | New | 364/200 X |
| 4,446,530 | 5/1984 | Tsuboka | 364/725 |
| 4,547,862 | 10/1985 | McIver et al. | 364/726 |
| 4,554,629 | 11/1985 | Smith, Jr. | 364/200 |
| 4,602,350 | 7/1986 | Gray | 364/900 |
| 4,682,301 | 7/1987 | Horiba et al. | 364/724.05 |
| 4,689,823 | 8/1987 | Wojcik et al. | 358/160 |
| 4,825,359 | 4/1989 | Ohkami et al. | 364/200 |

Primary Examiner—David L. Clark
Attorney, Agent, or Firm—Walter F. Dawson; Richard M. Sharkansky

[57] ABSTRACT

A memory having an address generator in an intelligent port which generates address sequences specified by an array transformation operator in a programmable processor, thereby allowing a controlling processor to proceed immediately to the preparation of the next instruction in parallel with memory execution of a present instruction. The intelligent port of the memory creates complex data structures from input data arrays stored in memory and directs the transformation of the data structures into output data streams. The memory comprises a plurality of read-write memory banks and a bank of read-only memory interconnected through intelligent ports and busses to other units of the processor. An arbitration and switching network assigns memory banks to the intelligent ports.

18 Claims, 10 Drawing Sheets

| 15 14 13 | 12 11 10 | 9 8 7 | 6 5 4 | 3 2 1 | 0 |
|---|---|---|---|---|---|
| DELTA 4 | DELTA 3 | DELTA 2 | DELTA 1 | DELTA 0 | F |
DISPLACEMENT CONTROL WORD 80
*Fig. 4A*
| 15 14 13 | 12 11 10 | 9 8 7 | 6 5 4 | 3 2 1 | 0 |
|---|---|---|---|---|---|
| LENGTH 4 | LENGTH 3 | LENGTH 2 | LENGTH 1 | MODE | B |
LENGTH CONTROL WORD 90
*Fig. 4B*
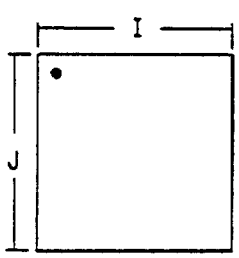
*Fig. 5A*
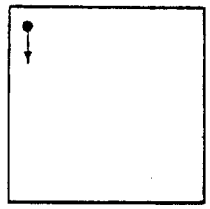
*Fig. 5B*
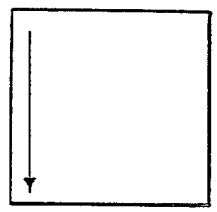
*Fig. 5C*
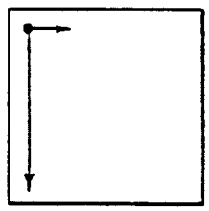
*Fig. 5D*
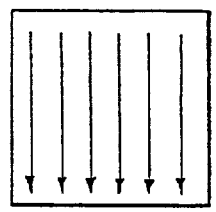
*Fig. 5E*

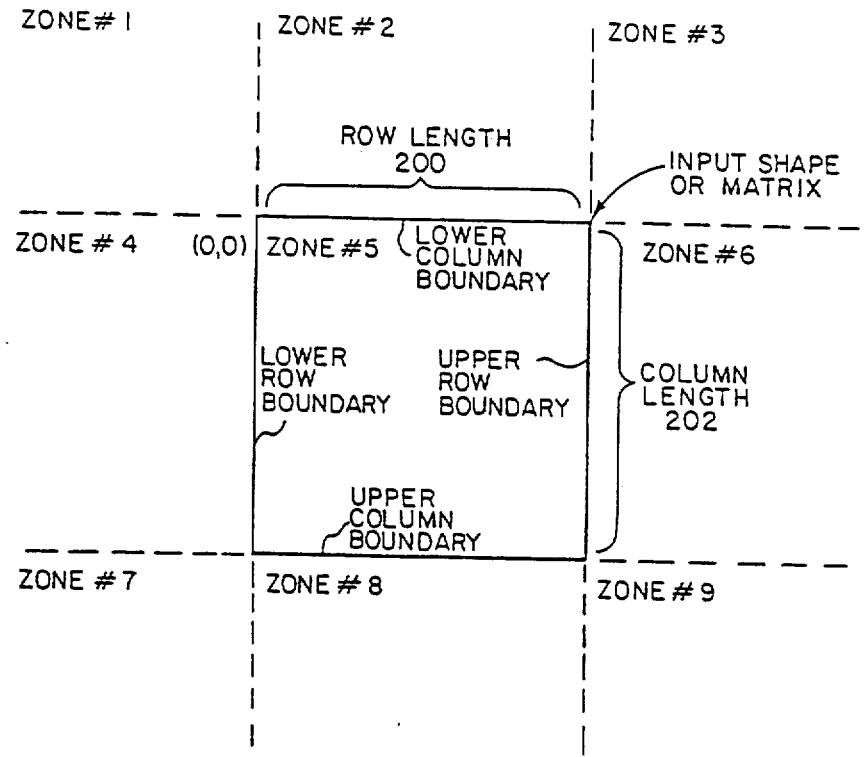
*Fig.15*
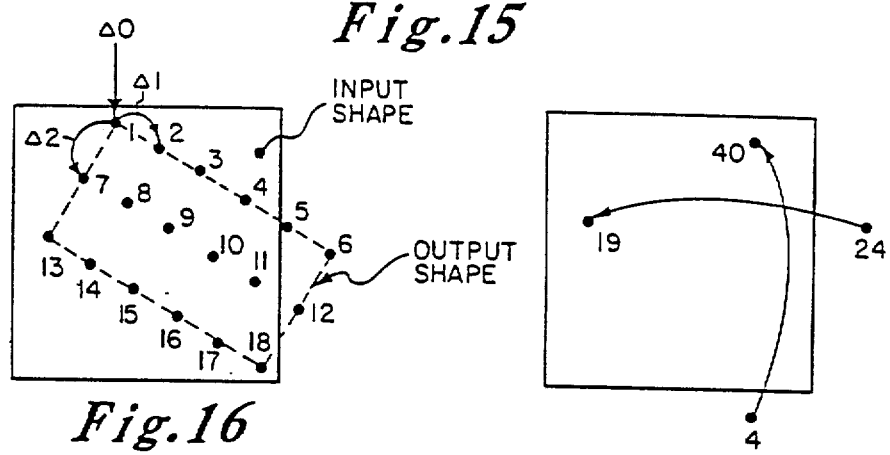
*Fig.16*
*Fig.17*
|   | 0 | 1 | 2 | 3 | 4 |
|---|---|---|---|---|---|
| 0 | 1 | 1 | 1 | 1 | 1 |
| 1 | 1 | $w$ | $w^2$ | $w^3$ | $w^4$ |
| 2 | 1 | $w^2$ | $w^4$ | $w^6$ | $w^8$ |
| 3 | 1 | $w^3$ | $w^6$ | $w^9$ | $w^{12}$ |
*Fig.18*

METHOD AND APPARATUS FOR ADDRESSING A MEMORY BY ARRAY TRANSFORMATIONS

The Government has rights in this invention pursuant to Contract No. N62269-82-C-0492 awarded by the Department of the Navy.

This application is a divisional application of Ser. No. 135,579 filed on Dec. 21, 1987, now U.S. Pat. No. 4,819,152.

BACKGROUND OF THE INVENTION

This invention relates generally to addressing a memory of a digital system, and in particular to the method and apparatus for addressing a memory by a set of parameters which specify an addressing sequence within the memory for data arrays.

In many digital processing systems, specially programmed units control the ordering of data access from memories while special purpose interfacing units link up components with different data formatting requirements. The proliferation of special purpose units results in inefficiencies, causing high system development costs, long development times, high programming costs, and high system maintenance costs.

The arithmetic unit (AU) in prior processors usually assisted the processor control unit to sequence data items to the arithmetic section or transform data items into a form appropriate for an operation to be performed; this not only increased the complexity of the control unit, but also interrupted data processing, causing a reduction in processor efficiency. In addition, often the AU is idle while the next instruction is being interpreted. It is desirable to continuously control formatting operations over related data items, like arrays, and to let the AU perform continuous AU functions.

Sometimes special purpose instructions are implemented in digital signal processors to facilitate performing vectormatrix mathematics. Generally, a series of instructions are required to perform a signal processing algorithm using the available special purpose instructions and other instructions for correctly indexing and dimensioning arrays. A higher order language that eliminates the need for ancillary parameters to index and dimension arrays is highly desirable, especially when the hardware required to implement such a language is not prohibitive.

A digital system is provided for accessing a multidimensional array of data in accordance with parameters of an array transformation. A method of generating addressing sequences for accessing a multidimensional array of data in a digital system is provided comprising the steps of interpreting instruction commands, performing arithmetic operations based on the instruction commands, storing data used in the arithmetic operations in a memory means, generating addressing sequences specified by an array transformation of a high-level programming language in accordance with a nested series of a plurality of parameters of the array transformation, for serially accessing all elements of the data array, and transferring the data between the memory means and arithmetic means performing the arithmetic operations as specified by the array transformation.

In accordance with the present invention a digital system is provided comprising means for interpreting instruction commands, means for performing arithmetic operations based on the instruction commands, means for storing a multidimensional data array for the arithmetic operations, the storing means comprising means for generating a plurality of addressing sequences in response to an array transformation of a high-level programming language for serially accessing all elements of the data array, and means for transferring the data between the storing means and the arithmetic operations performing means in accordance with the array transformation.

In accordance with a further feature of the invention a memory is provided comprising, means for storing a multidimensional data array, a plurality of read/write port means, the port means comprises addressing means for transferring all elements of the data array to and from a bus means in accordance with serial addressing sequences specified by an array transformation of a high-level programming language, the addressing means comprises means for generating a plurality of multidimensional indices specified by the array transformation, and switching network and arbitration means coupled between the storing means and the port means for routing data transfers between the storing means and the port means.

BRIEF DESCRIPTION OF THE DRAWINGS

The above-mentioned aspects and other features of the invention are explained more fully in the following description taken in connection with the accompanying drawings in which:

FIG. 4A and FIG. 4B show the control word formats for specifying an array transformation.

FIGS. 5A–5E show the sequences of factored addressing for transposing an array specified by an array transformation.

FIG. 15 illustrates a matrix having row and column boundaries and references zones outside said boundaries.

FIG. 16 shows one illustrative sequence of elements generated by a matrix access chip to define an output shape.

FIG. 17 illustrates index adjustment from outside array boundaries.

FIG. 18 shows a Digital Fourier Transform coefficient matrix illustrating that the exponent of w is the product of the row and column index.

DESCRIPTION OF THE PREFERRED EMBODIMENT

Figure 1:
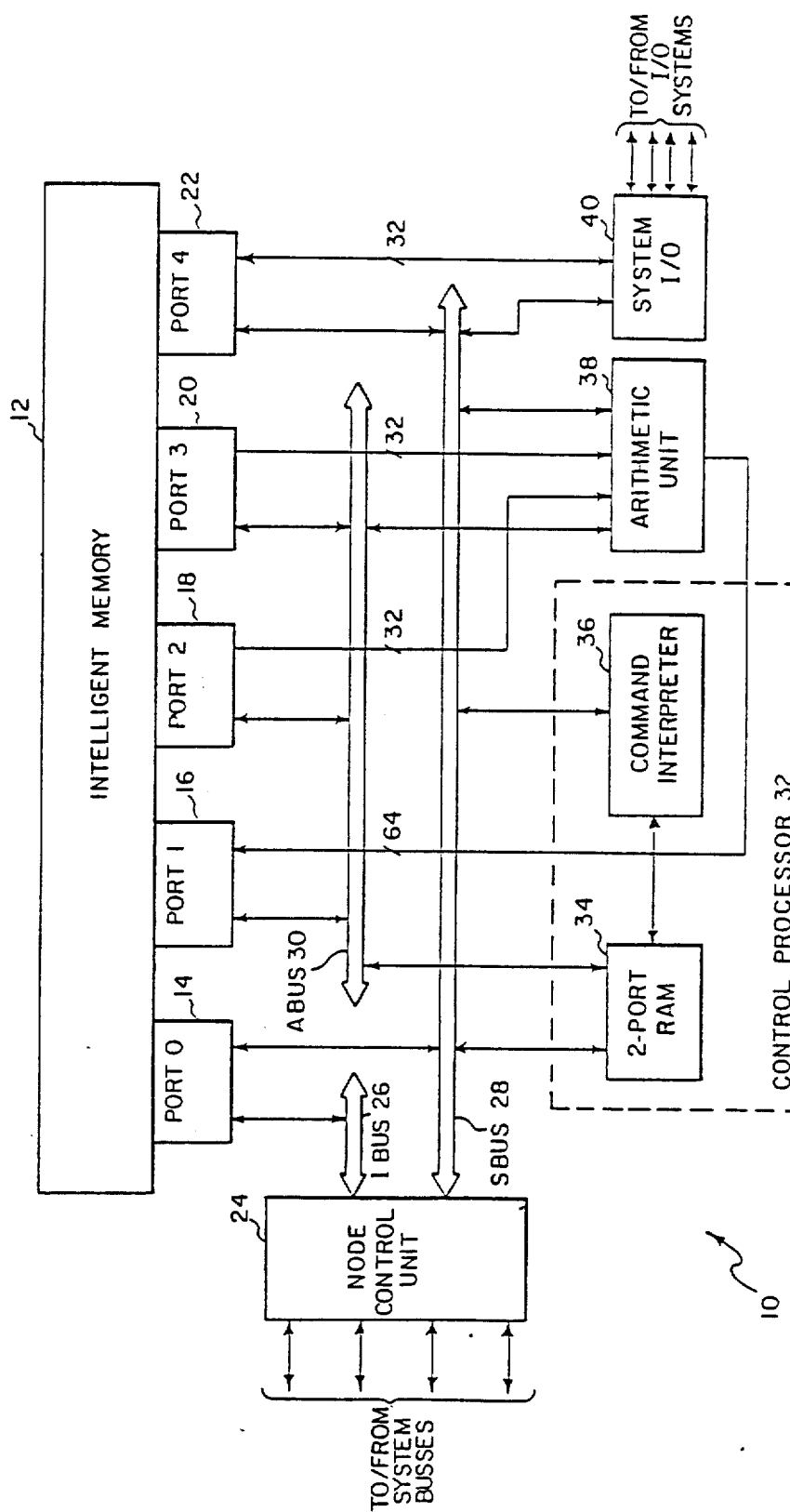
FIG. 1 is a block diagram of a Macro Function Signal Processor (MFSP) utilizing an intelligent memory device of the present invention.

Referring to FIG. 1, there is shown a block diagram of a Macro Function Signal Processor (MFSP) 10 illustrating an overall system in which an intelligent memory 12 may be used comprising an array transformation address generator implementation of the present invention. More particularly, the intelligent memory 12 may have a plurality of intelligent ports 14–22, although in the MFSP 10 embodiment described herein two of the ports 14 and 22 are simply serving as direct memory access (DMA) ports known to one skilled in the art. Port1 16, port2 18 and port3 20 are the intelligent ports in the system of FIG. 1, primarily because of their ability to execute addressing sequences based on an array transformation operator while completely hiding data attribute considerations from an arithmetic unit 38.

In addition to the intelligent memory 12, the MFSP 10 comprises the arithmetic unit 38, a control processor 32, a node control unit 24, a System I/O unit 40, an I Bus 26, an S Bus 28 and an A Bus 30. Intelligent port2 18 and intelligent port3 20 of the intelligent memory 12 each have 32-bit direct connections to inputs of the arithmetic unit 38 and a 64-bit output of the arithmetic unit 38 connecting to intelligent port1 16, thereby providing the means for streaming data to and from the arithmetic unit 33. The A bus 30 not only interconnects the three intelligent ports 16–20, but in addition serves as the MFSP 10 internal control bus interconnecting a 2-port RAM 34 of control processor 32 and the arithmetic unit 38. The control processor 32 comprises the 2-port RAM 34 and a command interpreter 36 for interpreting instructions and setting up the intelligent memory 12 and the arithmetic unit 38 for execution of said instructions. The system bus, S Bus 28, interconnects a plurality of units including the node control unit 24, port0 14, port4 22, 2-port RAM 34, command interpreter 36, arithmetic unit 38 and system I/O unit 40. DMA port0 14 is connected to the node control unit 24 via the I Bus 26. The node control unit 24 provides an interface between networks of high speed busses in a distributed multiprocessor and a processor or other device such as the MFSP 10. DMA port4 24 has a direct 32-bit connection to the system I/O unit 40 for system application I/O information transfer.

Figure 2:
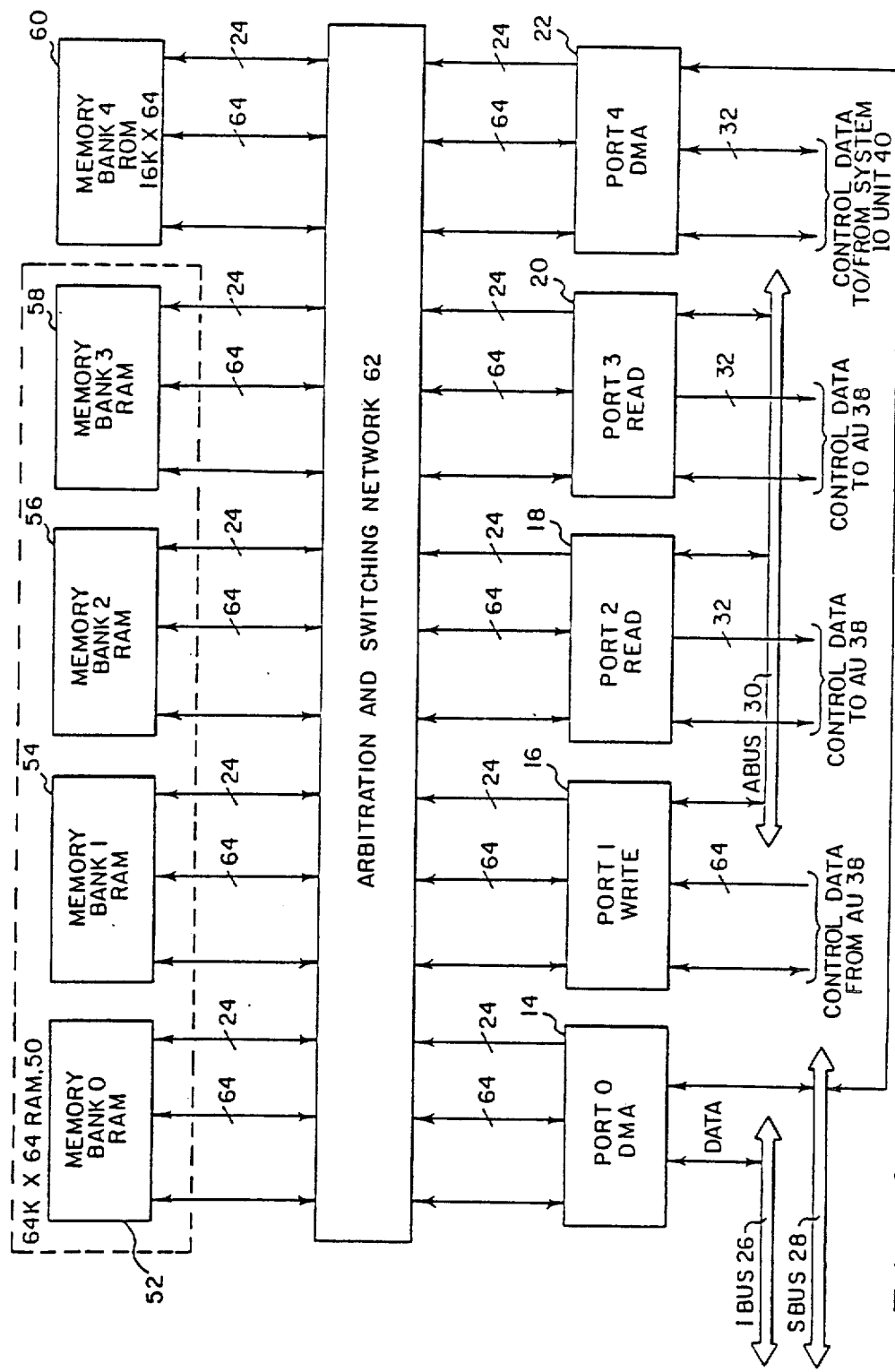
FIG. 2 is a block diagram of an intelligent memory and its interfacing busses.

Referring now to FIG. 2, there is shown a block diagram of the intelligent memory 12 comprising five memory banks 52–60, an arbitration and switching network 62 and a plurality of ports 14–22, including the three intelligent ports 16–20 and two DMA ports 14 and 22. The arbitration and switching network 62 directs the flow of data between the ports 14–22 and the memory banks 52–60; it provides an 88-bit wide, 5×5 crossbar switch with arbitration logic for the five inputs (ports) and five outputs (memory banks). Although a particular embodiment of the intelligent memory is described here for the MFSP 10, the invention is not limited to a specific number of memory banks nor to a specific number of intelligent ports nor to a specific size crossbar switch.

Still referring to FIG. 2, the 5×5 crossbar handles 64 bits for data, 24 bits for address and control from each of the ports 14–22. The arbitration logic resolves conflicts between the ports 14–22. If more than one port requests the same bank of memory, the arbitration logic holds off the lower (fixed) priority port until the higher priority port completes its transfer. Arbitration is performed on a cycle by cycle basis. Four of the memory banks, bank0 52, bank1 54, bank2 56 and bank3 58 are random access memories (RAM), each organized as 64K words by 64 bits. Memory bank4 60 is a read-only memory (ROM) organized as 16K words by 64 bits. Two of the RAM memory banks 52, 58 are used primarily by port2 18 and port3 20 which are primarily used as READ ports. The other two RAM memory banks are scratch pad areas of memory and as such are used primarily for storing intermediate values via port1 16 which is primarily used as a WRITE port. ROM memory bank 60 stores constants and approximation tables for use during the operation of various macro functions. The DMA ports 14 and 22 act as an interface between the I Bus 26 or the system I/O unit 40 and the intelligent memory 12 for the purpose of transferring large blocks of data; the blocks of transferred data reside in consecutive locations in the intelligent memory 12. The DMA ports 14 and 22 also interface with the S Bus 28 for control and status, the I Bus 26 or the system I/O unit 40 for transfer block data accesses external to the intelligent memory 12 and to the arbitration and switching network for transfer block data accesses to the intelligent memory 12.

The intelligent ports, port1 16, port2 18 and port3 20, have independent controls to address and format each data element. Each port's setup parameters describe the shape of the packed data, where it is to be found (i.e. base address), and the method of access (i.e. read/write, transposed, reversed, etc.). When a port is started, it begins accessing the first element of the described data and continues until all data is read or written regardless of errors. The read ports and write ports are identical except for port ID bits for determining the port's function.

Figure 3:
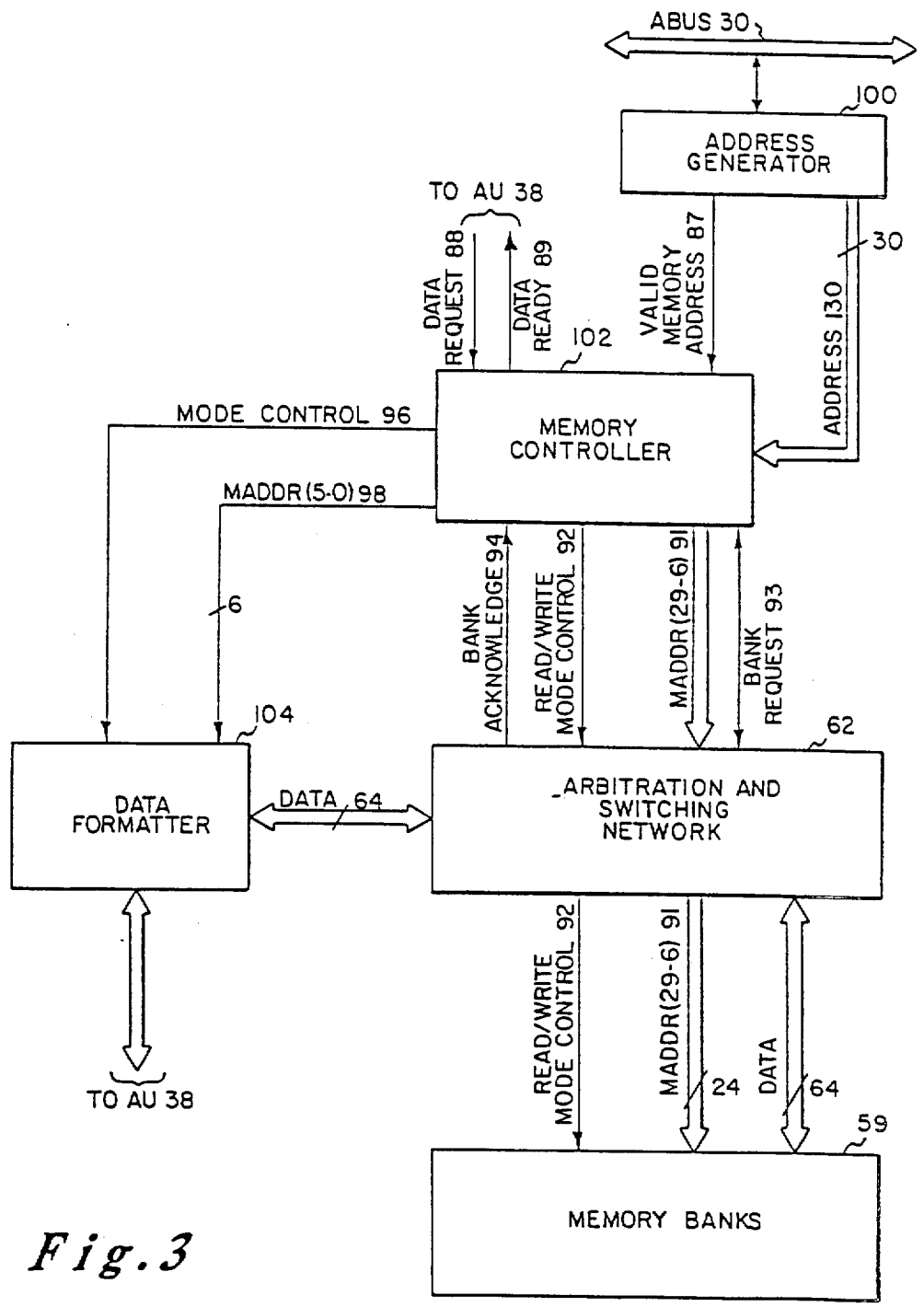
FIG. 3 is a block diagram of the invention comprising an intelligent memory port.

Referring now to FIG. 3, there is shown a block diagram of one of the intelligent memory ports 16–20 comprising an address generator 100, a memory controller 102 and a data formatter 104. The address generator 100 produces addresses to access a data array in memory banks 59 so that the data array can appear in various convenient shapes for arithmetic unit 38 manipulation. The data formatter 104 acts as a data translator between the memory banks 59 and the arithmetic unit 38. Data is packed into 64-bit words in the memo bank 59. Packed data is unpacked and left justified in the data formatter 104 prior to its use in arithmetic unit 38. The memory controller 102 provides control for the address generator 100 and the data formatter 104, as well as providing (control line) interfaces to the arithmetic unit 38. In addition, the memory controller 102 is coupled to the arbitration and switching network 62 and it initiates and controls all memory accesses of an intelligent memory port.

The intelligent memory 12 requires a small set of parameters to execute any addressing sequence required by a high-level signal processing language such as a Macro Function Language (MFL) described hereinbelow. These parameters have been integrated into a single addressing operator called an array transformation that directly specifies the hardware control parameters from the signal processing language syntax. The address generator 100 implements the address functions specified by the array transformation. A pair of 16-bit control words, the displacement control word 80 and length control word 90, as shown in FIGS. 4A and 4B and described hereinbelow, contain array transformation parameters and initialize address registers within the address generator 100 of any one of the intelligent ports 16–20 which then proceeds to execute memory address sequences specified by the array transformation.

Prior to describing further the structure and operation of the invention in conjunction with the drawings, it is necessary at this point to describe the array transformation operator and certain aspects of the language used to specify the parameters in the array transformation in order to understand the invention. The address generator 100 of the intelligent memory 12 as previously noted is functionally specified by the array transformation operator. The word "operator" is used here in the general mathematical sense of an entity that transforms an input into an output according to the definition of the operator. The input and output are both arrays, hence the name "array transformation." This operator describes array addressing in terms of a factored series of nested addressing sequences. An array transformation comprises ten parameters for specifying an operation and has the following syntax which is described below:

$$[\Delta 4 \; \Delta 3 \; \Delta 2 \; \Delta 1 \; | .\Delta 0]$$
$$[L4 \; L3 \; L2 \; L1 \; | \; B]$$

The language syntax corresponds directly to the parameters required to initialize the address generator 100 component in the intelligent memory 12. As a result, the mathematical definition of the array transformation operator serves as the hardware definition of the address generator 100.

An intelligent memory 12 becomes possible when the technique of instruction factoring is used in conjunction with the separation of data parameters from the processing program. Instructions are factored into control operators, variable functions, array modifiers, and operands. Each of these with the exception of functions has a significant effect upon memory operation. Control operators act as an addressing control mode to determine the sequence(s) of applying operand-data to the arithmetic unit 38. Control operators specify relationships between array transformations such as length parameters. Variable functions specify the arithmetic and logical operations to be performed on the elements fetched from memory. Array modifiers alter the normal addressing mode specified by the control operator in use. Operands refer to the specific data to be used.

When these instruction parameters are intentionally separated from the parameters of data, the data parameters can be maintained in a data descriptor. A data descriptor would consist of a collection of information describing the variable operands; such as data type, format and location. At run-time, a program references an operand through the variable's descriptor. Dynamic changes in data "shape" can be handled with no changes affecting the program. One important requirement of an intelligent memory is the treatment of an entire variable data array as a single operand. Consequently, the location of the data is determined by a base address or an initial reference point which references the initial element of the array of data.

Signal processing algorithms are conveniently expressed in the language of matrix mathematics. For this reason, MFL is an array-oriented language. Most variables in MFL programs denote many elements of related data to be treated as single entities. Most operations are defined directly on arrays without requiring item-by-item statements. MFL arrays take the form of vectors, matrices and blocks. Referencing an individual element of an array requires one, two or three numbers called indices to mark its position in the array.

A vector is an array whose elements are selected by a single index. In other words, a vector has one coordinate and is considered to be a collection of elements arranged in a line. The number of elements in this line is called the length of the vector. A null vector is a vector containing no elements. The length of a null vector is zero.

A matrix is an array whose elements are selected by two indices. It has two coordinates and is considered to be a collection of elements arranged in a rectangle. The number of elements in each row is called the row length. The position of an element along the row coordinate is called the row position or the column number. The number of elements in each column is called the column length. The position of an element along the column coordinate is called the column position or row number. Together, the row length I and column length J constitute the "shape" of the matrix. The shape is written J;I.

In some applications the matrix has a direct correspondence to some physical reality such as the data derived from an array of pixels which represent a planar image. In these cases the properties of a matrix are directly applicable to the processing. In other cases the matrix is simply a convenience for purposes of processing. In many signal processing operations, a matrix is merely a collection of vectors. The shape is consistent with the number of row vectors and the length of each vector (which is equivalent to the number of columns). The processing requires an iterative use of the vector set using and modifying one vector at a time. Consequently the usual interpretation of an array modifier is to apply it to each row vector rather than to the entire array or matrix. Of course it is sometimes necessary to modify the complete array as well. In this case the array can be considered as a single long vector.

A block is an array whose elements are selected by three indices. It has three coordinates and is considered to be a collection of elements arranged in a set of matrices. A block uses the row and column terminology defined previously for matrices. In addition, the number of matrices in the block K is called the depth of the block. The position of an element along this coordinate is called the depth position or the matrix number. Together, the row length, column length and depth constitute the shape of the block. The shape of the block is written K;J;I.

To illustrate the concept of factored addressing, the following example qualitatively describes array transposition in terms of factored addressing. When a matrix in row-major order is read by columns instead, the output will be a matrix with rows consisting of columns from the input array. The output array is of rank two, implying that the procedure must require two displacement sequences.

Referring now to FIG. 5, let I equal the length of rows in the input array and let J equal the length of columns. The array transformation is described by the following sequences:

(0) Start at the upper left corner of the array.

(1) Move down one point in the column direction J−1 times to define a line of J points. Return to the point before the first displacement in the column direction.

(2) Move across one point in the row direction and repeat step (1) I−1 times to define an I×J matrix.

The sequences illustrated in the preceding example may be generalized into a procedural definition of the array transformation:

(0) Go to the initial point delta 0 (Δ0).

(1) Move by displacement delta 1 (Δ1 a total of L1−1 times to define a line of L1 points. Return to the point before the first displacement of this sequence.

(2) Move by displacement delta 2 (Δ2) and repeat step one L2−1 times to define a matrix of L2×L1 points. Return to the point before the first displacement of this sequence.

(3) Move by displacement delta 3 (Δ3) and repeat steps one and two L3−1 times to define a block of L3×L2×L1 points. Return to the point before the first displacement of this sequence.

(4) Move by displacement delta 4 (Δ4) and repeat steps one, two and three L4−1 times and stop.

The result is a set of L4 blocks of L3×L2×L1 points. The rank of the output array is equal to the number of displacement sequences required to generate it. With the above definition, output arrays of up to rank four are possible. Each nested sequence corresponds to a separate hardware circuit. When necessary, more sequences may be added to the definition to produce shapes of higher rank. In a Macro Function Language (MFL), an array transformation on an input array C is specified by ten parameters written directly below the name of the array and its data descriptor according to the following syntax:

| C |
| --- |
| C16 10;20 |
| [Δ4 Δ3 Δ2 Δ1 \| Δ0] |
| [L4 L3 L2 L1 \| B] |

The parameters fall into three categories: displacements (Δ), lengths.(L) and boundary modes (B).

Figure 6:
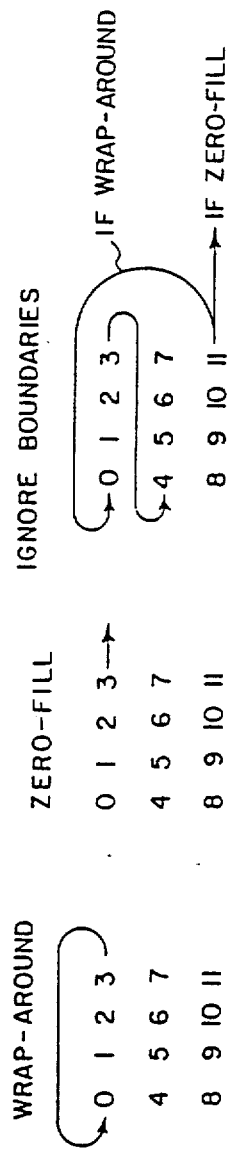
FIG. 6 illustrates three boundary modes and functions when an address generator displacement encounters the right edge of a matrix.

Referring now to FIG. 6, the boundary mode (B) parameter of an array transformation sets a geometrical context for the displacements and lengths. The boundary mode determines the action of the address generator 100 if a given displacement results in an address that falls outside the boundaries of the array. The boundary modes are as follows:

W=wrap-around. When a boundary is encountered by a displacement, the address generator continues to read on the other side of the array. For example, when reading from left to right along a row, the address generator 100 moves back to the left-most element of the row if the right edge is encountered.

Z=zero-fill. All points outside the array are assumed to be zero for a read port and valid data from the AU 38 is dropped for a write port.

I=ignore boundaries. This suffix may be appended to either zero-fill or wrap-around. In this case, all boundaries except the last point in the array are ignored. So wrap-around with this suffix moves the address pointer back to the head of the array, whereas zero-fill keeps the pointer going.

FIG. 6 shows the effect of each boundary mode on an address generator displacement encountering the right edge of a matrix.

Figure 7:
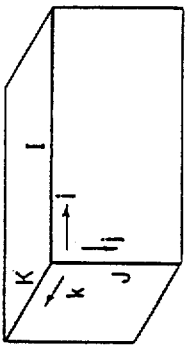
FIG. 7 illustrates directions of i, j and k displacements on a I; J; K block.

Displacements of an array transformation are iteratively added to an initial point to generate addresses in a regular sequence. The displacements are defined as pairs of numbers representing generalized spacing on a two-dimensional surface, thereby facilitating detection of the endpoints of each row and column of a matrix. This representation is appropriate for most signal processing macros. If desired, the concept may be extended to n-tuples for general displacements on an n-dimensional array. Displacements on arrays may be written as complex numbers where the imaginary part is the displacement in the row direction and the real part is the displacement in the column direction. Real number displacements are in the row direction with no displacement in the column direction. Either form may be used with vectors, matrices and blocks. Symbols may also be used. As shown in FIG. 7, "i" defines a unit displacement to the right across the row direction, "j" defines a unit displacement down the column direction, and "k" defines a unit displacement into the depth direction. Displacements by multiples of either i, j or k are indicated by preceding the symbol with the size of the displacement. For example, −5j denotes a displacement by five points in the negative column direction.

A general displacement through a block requires a triplet of numbers in a particular form (e.g. depth; column; row). For most applications, the k direction does not require the same level of flexibility given to the j and i directions. Data formed into a three-dimensional block usually can be treated as a set of matrices. In these instances, two-dimensional displacements on each matrix along with sequential accessing of each matrix in the block are sufficient. As a result, displacement triplets through a block are not always directly supported in hardware. However, devices implementing larger n-tuples might be advantageous for some applications. A variable displacement value may be stored in a co-operand to the array transformation. Presence of an explicit value in the co-operand is indicated by a "d" symbol in the corresponding displacement of the array transformation. The "d" is used for user-defined variable, and may also be defined by a translator in order to insert a non-coded constant into the appropriate register of the address generator 100. The displacements notation of an array transformation along with their interpretation in terms of Δ1 through Δ4 are summarized as follows:

Xi=Moves across the row X points to the right.
Yj=Move Y points down the column.
Zk=Move Z points into the depth.
0=Do not displace—repeat the previous sequence.
d=The displacement is contained in a variable co-operand to the array transformation.
b;a=Move "a" points along the row and "b" points down the column. c;b;a=Move "a" points along the row, "b" points down the column, and "c" points into the depth.

The instruction loading time is reduced by assigning codes to the most frequently required displacements. One possibility is to choose three-bit codes for ±i, ±j, ±k, or 0. The eighth code is for "d", to signify that the displacement value is a separate complex number sent by the command interpreter 36. All variable displacements and constants not equal to ±i, ±j, ±k, or 0 are sent to the address generator 100 as "d"'s. In a two-dimensional address generator, each "d" is replaced with a complex number denoting a general displacement in the combined i and j directions. If either the real or imaginary part is zero, the displacement is solely in the i or j direction respectively. "k" displacements of the form Zk are specified as Z x Jj, on an array reshaped to (K×J);I. Hardware directly supporting the full three-dimensional representation would require "d"'s in the form of triplets. With the three-bit codes, four displacements and the initial point can be placed into a single 16 bit word as shown in FIG. 4A.

Figure 8:
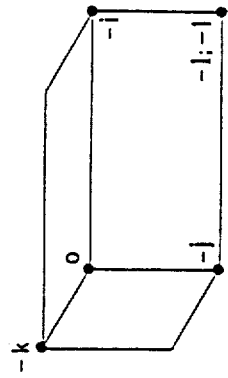
FIG. 8 shows some initial points within a block for wrap-around boundary.
Figure 9:
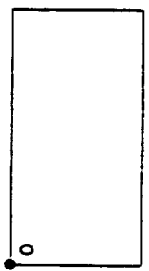
FIG. 9 shows some initial points in the zero-fill boundary mode.

Referring now to FIG. 8 and FIG. 9, the initial point is a displacement from 0;0;0, the upper left corner of the array. For negative values, its location depends on the boundary mode. FIGS. 8 and 9 compare the different locations of some initial points for wrap-around and zero-fill. For wrap-around, the displacements to a few of the corners of a block are as follows:

- −i=upper right corner
- −j=lower left corner
- −k=upper left deep corner
- −1;−1=lower right corner
- 0=upper left corner For zero-fill, all of these points are clustered about the upper left corner of the array as shown in FIG. 9. The zero-fill mode interprets the array as having infinite extent with elements outside the K;J;I shape set to zero.

Lengths of an array transformation are real integers indicating the number of times a displacement is performed and the resulting shape of the array. Several mnemonics are provided to specify output lengths in terms of the input shape of the array. A capital letter "K" indicates the depth, "J" indicates the column length and "I" indicates the row length of the input array. Other numeric lengths must be written explicitly in the transformation if they are constant and in a co-operand if they are variable in a form similar to explicit displacements.

For most numerical applications, two ports simultaneously access data to create a pair of input streams for a dyadic function. If a displacement must occur as many times as necessary to match the corresponding displacements of the other input argument to a dyadic function, the number "1" is written. This symbol may be overwritten at run time by the command interpreter 36 with the appropriate length to match the other argument's array transformation or port1 16 and port2 18 can monitor the corresponding port length to determine the replacement length dynamically. If the two array transformations have corresponding lengths equal to one, no displacement occurs for the sequence. This is how a control operator becomes two coupled array transformations.

A displacement may be specified to continue until a boundary of the array is encountered. The length S, meaning "stop on boundary," is used for this case. In wrap-around mode, if length m is set to S, displacements by Δm continue until a Δm encounters a boundary. In zero-fill mode, displacements by Δm continue until any lower level displacement encounters a boundary.

When stop on boundary is used as a length parameter of a port addressing one of the input data streams of a dyadic function, the corresponding length in the other port must be "1", meaning "repeat until the other array stops on its length." The following summarizes the array transformation length symbols:

K=depth of input array
J=column length of input array
I=row length of input array
d=the length is contained in a variable
1=repeat as necessary to match a corresponding output array shape
S=stop displacing when a boundary is encountered These six lengths are specified in terms of three-bit codes similar to displacements. The entire length field and boundary mode occupy a single 16 bit word as shown in FIG. 4B.

The following examples show a few simple forms of array operations possible with array transformations. Each example is given in terms of a Macro Function Language (MFL) syntax. The array transformation is applied to an array B or C of some sample shape and type contained in its data descriptor. Below the array transformation is written the data descriptor of the output array from the transformation. The parentheses enclosing this information indicate that it is a response from the intelligent memory 12.

Normal read. The ordering of arrays in row-major order with blocks consisting of sets of matrices implies that normal accessing of data from memory will be:

| B |
|---|
| C16 2;8;4 |
| [0 k j i\|0] |
| [1 K J I\|W] |
| (C16 2;8;4) |

The transformation is applied in this example to a block B of 16-bit complex data shaped 2;8;4. The notation specifies that the array access begins at the initial point 0, the upper left corner of the input array. The primary displacement is i, the row direction, to form an output row of length I. Next the access moves by j, the column direction, and repeats the first set of displacements to form an output matrix shaped J;I. The third displacement sequence is by k, the depth, followed by repetition of the column and row displacements to produce the final K;J;I output shape. The fourth displacement is a repeat with length 1 to allow for repetition of the block shape to match a corresponding output array of rank four, if necessary. Since this transformation left the array in its original form, it is considered the identity operator.

Block Transposition. Some algorithms require that a block of data is to be read by depth, then by column, for each row. In this case, the array transformation is as follows:

| B |
|---|
| C16 2;8;4 |
| [0 i j k\|0] |
| [1 I J K\|W] |
| (C16 4;8;2) |

The array access begins at the initial point 0, the upper left corner of the input array. The primary displacement is k, the depth direction, to form an output row of length K. Next the access moves by j, the column direction, and repeats the first set of displacements to form an output matrix shaped J;K. The third displacement sequence is by i, the row direction, followed by repetition of the column and depth displacements to produce the final I;J;K output shape.

Transpose. The following array transformation transposes matrix B so that rows become columns and columns become rows. The R16 means that the array shaped 10;20 contains real 16-bit data.

| B |
|---|
| R16 10;20 |
| [0 0 i j\|0] |
| [1 1 I J\|0] |
| (R16 20;10) |

In this and subsequent matrix examples, it is understood that for blocks, the array transformation would be repeated for each matrix of the block.

Inner product addressing. The addressing for a matrix multiply matches the row vectors of B against the column vectors of C. Each row vector of B is repeated to match each of C[I]column vectors in C before the next row of B is read. The array transformations are as follows:

| B | C |
|---|---|
| R16 10;20 | R16 20;15 |
| [0 j 0 i\|0] | [0 0 i j\|0] |
| [1 J 1 I\|W] | [1 1 I J\|W] |
| (R16 10;15;20) | (R16 10;15;20) |

The first sequence in the B array transformation is by i for length I, meaning that a row vector from B is read. The corresponding sequence for C reads a column, implying that B[I], the row length of B, and C[J], the column length of C, must be identical. The second sequence for C is i for length I, meaning that the columns of C are read consecutively. The row vector of B is repeated to match the number of columns in C, as indicated by the 0 displacement and the 1 length. This matching is repeated for every row vector in B, as indicated by the j for length J in the third sequence of B and the corresponding repeat for C.

Several conventions may be used to abbreviate array transformations as follows:

1. When no displacement is written, assume that it is 0(1), meaning "repeat as necessary to match the other input array."
2. When no length is written with an i or −i, assume that the length is I, the row length of the variable.
3. When no length is written with a j or −j, assume that the length is j, the column length of the variable.
4. When no length is written with a k or −k, assume that the length is K, the depth of the variable.
5. When no initial point is given, assume that it is 0. When the initial point is defaulted, the vertical line used to separate the initial point from other displacements is deleted.
6. When no boundary mode is given, assume that B equals wrap-around.
7. If no array transformation is given, assume that it is a normal read:

| [0 k j i\|0] |
|---|
| [1 K J I\|W] |

8. An array transformation may be written with the entire displacement line omitted. In this case, the remaining line specifies the lengths in the form to be used with a normal read. To indicate that the displacement line has been omitted, the length line is written with the type and packing in the form of a new data descriptor. Semicolons are used to separate the lengths.

| B | | B |
|---|---|---|
| R16 3;8 | is equivalent to | R16 3;8 |
| R16 3;4 | | [0 k j i\|0] |
| | | [1 K 3 4\|W] |

Figure 10:
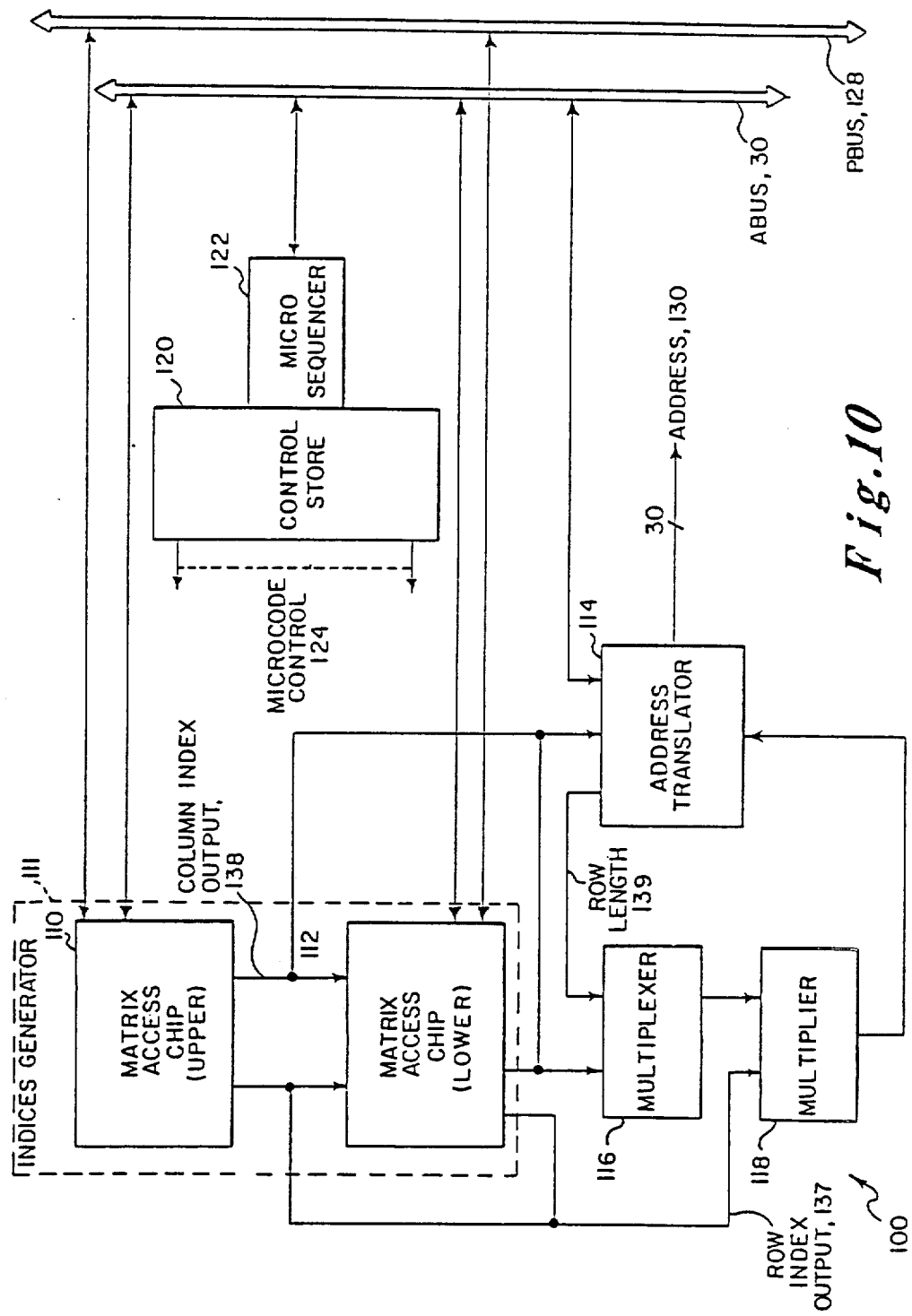
FIG. 10 is a block diagram of the address generator of the present invention.

Returning now to the description of the structure and operation of the invention, and referring now to FIG. 10, there is shown a block diagram of the address generator 100, which provides an address 130 for its intelligent port each machine cycle. The address generator 100 comprises a micro sequencer 122 along with its control store 120, an indices generator 111 comprising two matrix access chips (MAC) 110 and 112, an address translator 114, a multiplier 118 and a P Bus 128 for information transfer within the address generator 100. The matrix access chips (MAC) 110 and 112 provide row and column indices specified by the parameters of an array transformation which are loaded into MAC 110, 112 via the 16-bit displacement control word 80 shown in FIG. 4A and the 16-bit length control word 90 shown in FIG. 4B for addressing each and every data element of an array.

This pair of 16-bit control words containing array transformation parameters shown in FIG. 4A and FIG. 4B initialize address registers within the address generator 100 of any one of the intelligent ports 16–20 which then proceeds to execute memory address sequences specified by the array transformation. The displacement control word 80 as shown in FIG. 4A has six fields. Five of these fields are identical and contain 3-bit codes for specifying each of the displacement parameters, delta 4 through delta 0, of an array transformation. The other field is a 1-bit fractional field (F) which when set to a 1 indicates that the least significant 5-bits of a 16-bit data bus are used to support fractional displacement. Table 1 lists the eight functions available for most of the delta fields (except for the P function).

The length control word 90 as shown in FIG. 4B has six fields. Four of these fields, length 4 through length 1, are identical and contain 3-bit codes for specifying each of the length parameters of an array transformation. The "mode field" is also 3-bits and the Boundary (B) field is 1-bit. Each of the length fields has eight possible functions and Table 2 lists these functions and their definitions. The mode field defines the modes of operation within the address generator 100 of the matrix access chips 110, 112, and Table 3 lists the eight modes. The boundary field bit, B, determines the response of the intelligent ports 16, 18, 20 when a boundary condition is encountered. When set to "0" the port performs a zero-fill mode. The boundary modes are described herein and illustrated in FIG. 6.

Each MAC device 110, 112 may be implemented with a 180 pin, 7500 gate, CMOS gate array technology. The address translator 114 is coupled to the MAC 110 and 112 and the multiplier 118. The multiplier 118 may be embodied by model IDT7217L multiplier manufactured by Integrated Device Technology, Inc. of 3236 Scott Boulevard, Santa Clara, Calif. 95051. The address translator 114 converts the row and column indices to the 30 bit address 130 which points to the location of the most significant bit of a data element in the intelligent memory 12. The multiplexer 116 can be controlled so that row and column indices are multiplied together to produce FFT coefficients. The address translator may be implemented with a 144 pin, 5700 gate, CMOS gate array technology. The microsequencer 122 and its associated control store 120 directly control index generation in the MAC 110 and 112 and provide control signals for data flow within the entire intelligent memory 12 pipeline. The microsequencer may be implemented with an AS890 sequencer manufactured by Texas Instruments Incorporated of Dallas, Tex. 75265 The MAC 110, 112, devices together with the microsequencer 122, constitute the bulk of the "intelligence" of the Ports 16, 18 and 20.

The partitioning of the MAC 110, 112 logic provides a slice architecture that allows each MAC 110, 112 to independently address two dimensional variables specified by an array transformation. The intelligent memory architecture supports two independent address streams one at a time, with switching between the streams under microcode control 124 as directed by the 3 mode bits in the length control word 90. Hence, the 3 mode bits provide eight modes of operation summarized in Table 3 for the MAC 110, 112 and are as follows: MAC DUPLEX Mode refers to the operation of each MAC independently, each producing its own address sequence, while MAC SIMPLEX Mode refers to the operation of the MAC 110, 112 devices together to produce a single address sequence. Simplex mode comprises a full simplex mode and a half simplex mode. Full simplex mode uses both MACs 110, 112 but half simplex mode uses only the lower MAC 112. Half simplex mode is only an optimization for speed that comes from microcode partitioning. Duplex mode contains submodes called flushed duplex mode and non-flushed duplex mode each having three variations for a scalar, vector, and matrix. Flushed mode data are routed back into Address Generator 100 through the P BUS 128, whereas nonflushed mode data go to the AU 38 or the address directs where AU 38 data goes in RAM memory 50. Scalar, vector, and matrix modes determine when the rest of intelligent memory services the indices generated by the other MAC.

Figure 11:
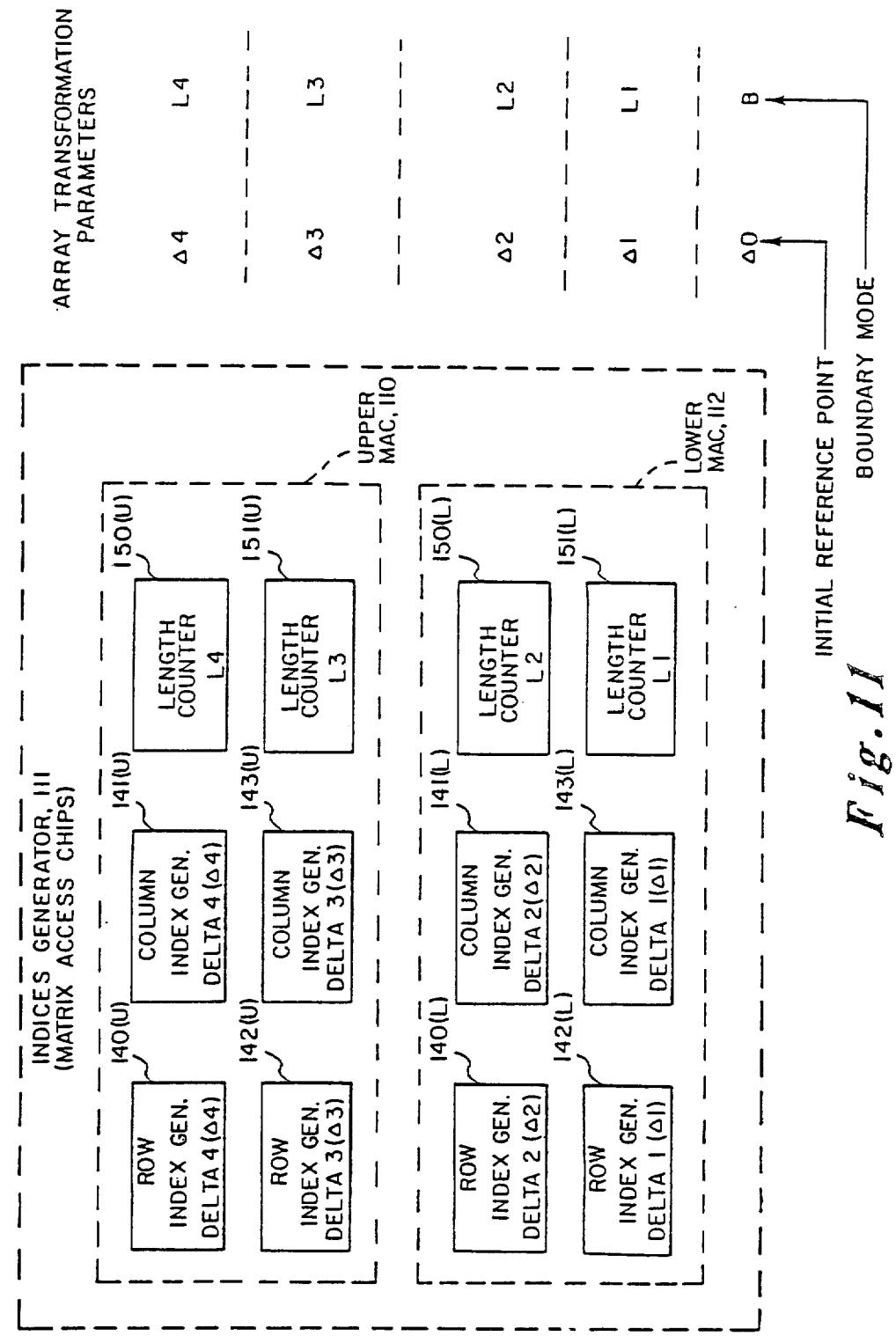
FIG. 11 shows the location of the array transformation parameters within the upper and lower matrix access chips.

The architecture of the MAC 110, 112 devices allows direct support of array transformation statements and MAC 110, 112 devices are cascaded within the indices generator 111 to handle up to four dimension variables. The idea of displacement and length parameters as described hereinbefore is the basis of the array transformation statements. FIG. 11 shows the location of the array transformation parameters within the cascaded upper and lower matrix access chips 110, 112 of the indices generator 111. Array transformations supported by the pair of MAC 110, 112 devices allow for a generic method of generating an address sequence for a rank four output shape array from a rank two input shape array.

Figure 12:
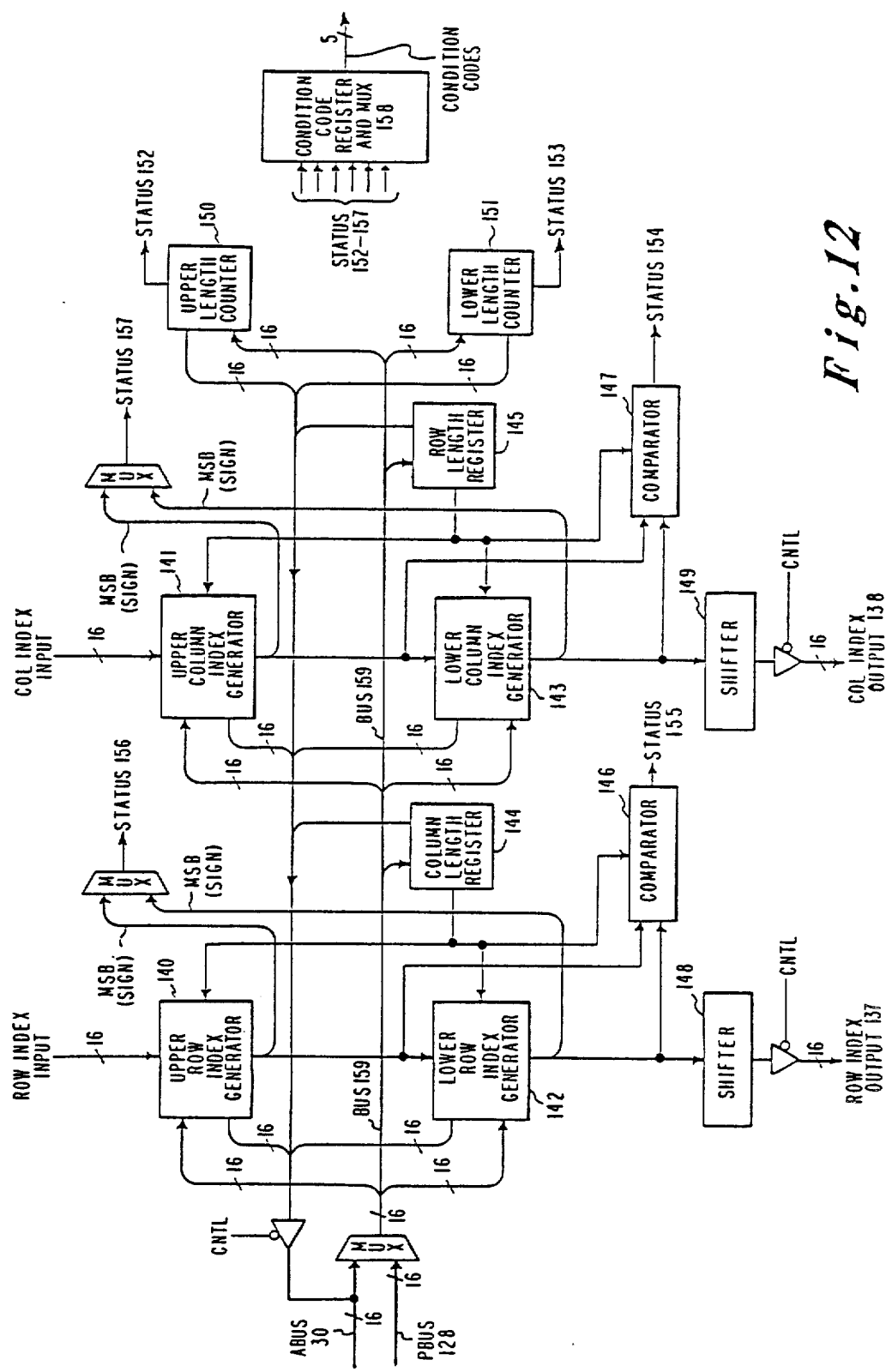
FIG. 12 is a block diagram of one of the matrix access chips in the indices generator of the address generator.
Figure 13:
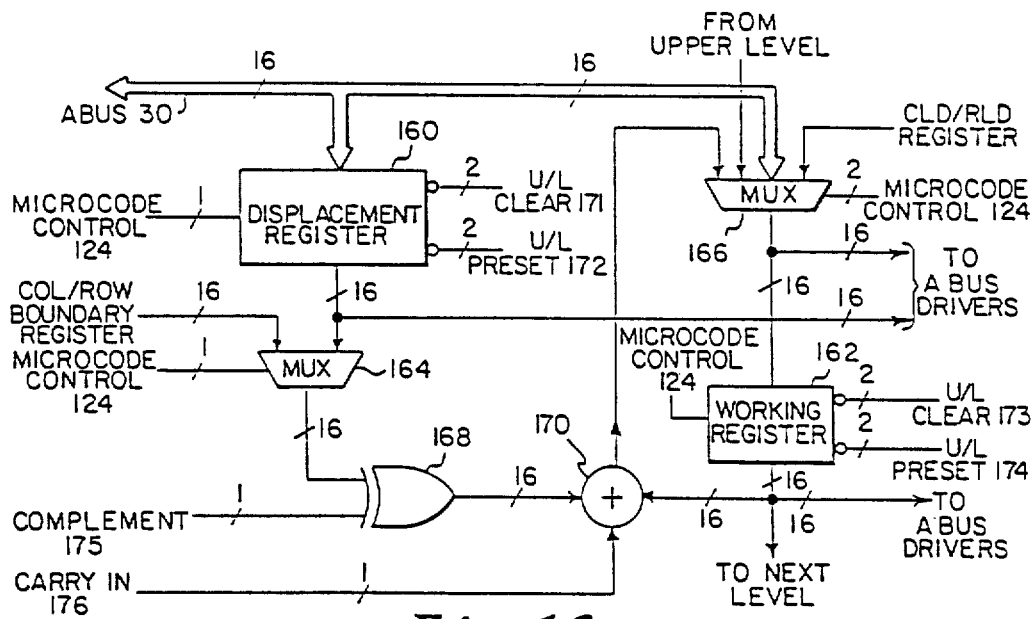
FIG. 13 is a block diagram of one of the index generators in the matrix access chip.

Referring now to FIG. 11, FIG. 12 and FIG. 13, there is shown the functional structure of a MAC 110, 112 device. Within each MAC 110, 112 there are four index generators 140–143 comprising an upper row and column index pair 140, 141 and a lower row and column index pair 142, 143. Each index generator contains a 16-bit base working register 162 and a 16-bit displacement register 160 as shown in FIG. 12. Each of these two registers can be written to and read from via the A BUS 30 prior to instruction execution.

The data in the displacement register 160 of the lower MAC 112 once loaded from the CI 36, will not change.

All data held in the MAC 110, 112 will be 16-bit two's complement and loaded as integers. When the fractional addressing mode is selected, the shifters 148, 149 will shift the data 5 bits to the right (sign extended) before the index is produced. When the fractional addressing mode is not selected then all loaded data is in integer format and the shifters are transparent.

The comparators 146, 147 make running comparisons between the current index and the contents of the two boundary registers, column length register 144 and row length register 145. The running comparison allows the circuitry to determine when the current index has exceeded the boundary limits of the "Input Shape" via the status bits in the condition code register and MUX 158. The Input Shape is defined by the contents of the column length register 144 and row length register 145. The upper length counter 150 and lower length counter 151 are used to count the number of displacement increments imposed on the contents of the Δ0 register contained in the same level. As each displacement is added to the current content of Δ0 the associated length counter within that level is decremented. Negative sign detection circuits generate status 152, 153 bits which flag to the microsequencer 122 the boundary of the output shape.

Still referring to FIG. 13 showing a block diagram of one of the index generators 140–143, both the displacement register 160 and the working register 162 have four clear and preset inputs 171–174. Two of these are dedicated to the selective clears or presets of the upper 15-bits of the register. The other two preset and clear inputs are dedicated to the least significant bit (LSB) of the register. Hence, these registers 160 and 162 are asynchronously preset and cleared to one of four default values 0, 1, −1, −2. Each one of the index generators 140–143 has a 16-bit complement capability performed by exclusive-or gates 168 and the complement 175 signal. Also, there is a 16-bit fast carry adder 170 complete with carry input 176. This architecture allows the uncomplemented or complemented contents of the displacement register 160 or column length registers 144 and row length register 145 to be added to the current content of the working register 162.

The upper and lower level registers in the index generators 140–143 in each MAC 110, 112 are distinguished by the prefix U and L respectively. Thus, the displacement register 160 and the working register 162 in the index generator of the MAC 110, 112 devices have the following designations:

uri;uci=Row and Column upper level working registers (U 0)

lri;lci=Row and Column lower level working registers (L 0)

udri;udci=Row and Column upper level displacement registers (U 2/4)

ldri;ldci=Row and Column lower level displacement registers (L 1/3)

Hence, each MAC 110, 112 has an upper and lower displacement register 160 in each of the upper and lower index generators 140–143 for storing the Δ4 and Δ3 displacement parameters of an array transformation. Where there is a need to distinguish between upper and lower MACs, then the prefix U or L will be used.

Figure 14:
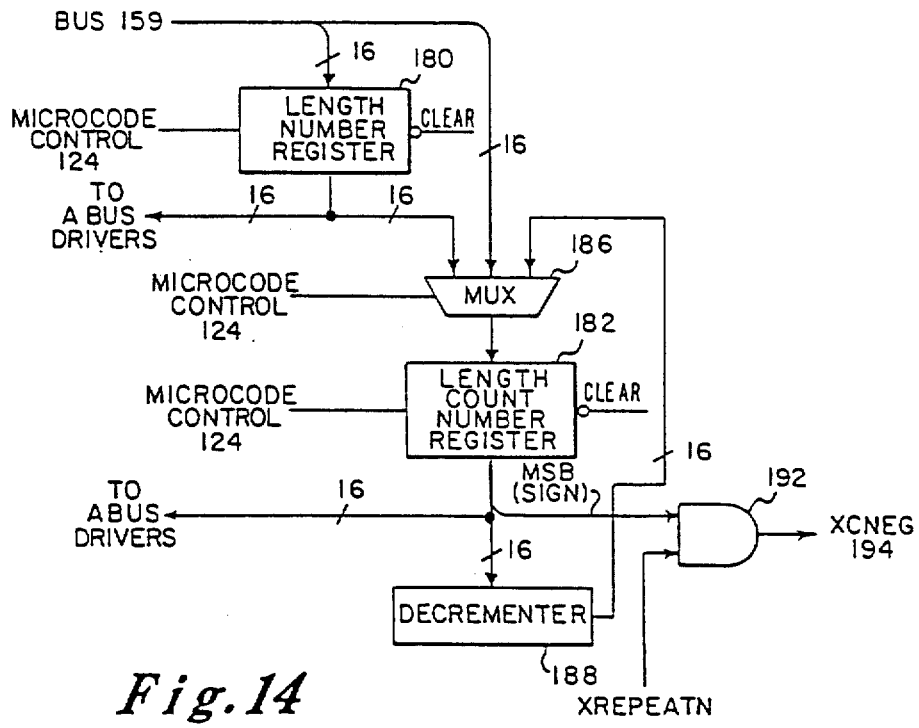
FIG. 14 is a block diagram of one of the length counters in the matrix access chip.

Referring now to FIG. 14, there is shown a block diagram of the length counter 150, 151. The length number register 180 contains static data (i.e., not updated during execution) and acts as a reference for re-initializing the length count number register 182. The length count number register 182 contains a current count of the number of displacements that an index generator 140–143 will invoke in order to generate a one dimension access sequence. Each level of a MAC 110, 112 handles one dimension. Thus, the MAC 110, 112 length registers are referred to as follows:

UN=upper level number register
UCN=upper level count number register
LN=lower level number register
LCN=lower level count number register The length counter 150, 151 is provided with a negative sign detection capability which allows the microcode to determine via the XCNEG 194 status bit whether or not to continue with the displacement increments within the index generator belonging to the same level.

The length counter 150, 151 decrements the current content of the length count number register 182 by one when a valid index offset pair has been generated. If the current count is negative then it stays negative even after several decrements executed due to condition code pipeline delay. This gives the circuitry more time to catch the end condition. Both the length number and count number registers 180 and 182 contained in a length counter 150, 151 allow read and write access over the bus in a similar manner as the index generator 140–143. However, these registers 180 and 182 are not independently writable because this function is not required.

Referring now to FIG. 15, there is shown a matrix with a plurality of zones identified outside of its boundaries. The row length 200 and column length 202 comprise the "INPUT SHAPE". The top left hand corner is regarded as the zero reference point. An initial displacement 0 is an offset from this reference point. The input shape or matrix consists of the number of rows and column of data elements and is thus limited to two dimensions. Each data element is uniquely defined in terms of its row index and column index. The reference point is therefore defined as (0,0). An element in zones 1, 4 or 7 is said to have exceeded the lower row boundary of the input shape. The column index of any such elements will be negative. The MAC 110, 112 are therefore required to handle negative numbers via the two's-complement notation. The MAC 110, 112 supplies to the microsequencer 122 a status bit 157 sourced from the sign bit of the current column index. An element in zones 1, 2 or 3 is said to have exceeded the lower column boundary of the input shape or matrix. The row index of any such elements will be negative. The MAC 110, 112 supplies to the microsequencer 122 a status bit sourced from the sign bit of the current row index.

An element in zones 3, 6 or 9 is said to have exceeded the upper row boundary of the input shape or matrix. Any such elements will have positive column indices but the integer value of the column length 202 will be greater than or equal to the row length 200.

A running comparison is performed between the current column index of each level and the column length of the input shape. The MAC 110, 112 supplies to the microsequencer 122 a status bit 154 which indicates the result of this running comparison.

An element in zones 7, 8 or 9 is said to have exceeded the upper column boundary of the input shape or matrix. Any such elements will have positive row indices of integer value greater than or equal to the column length. A running comparison is performed between the current row index of each level and the column length. The MAC 110, 112 supplies to the microsequencer a status bit 155 which indicates the result of this running comparison.

Referring now to FIG. 16, in addition to FIGS. 11–14, a MAC 112 is required to generate a sequence of elements in response to an array transformation where each element is specified by a row index and a column index pair which will define an output shape. Movement from one element to the next element in a sequence is accomplished by specifying the contents of a row and column displacement register 160 and adding it to the contents of the current working register 162 and decrementing the length counter 182 in a MAC 112. The lower level of the MAC 112 is used for this one dimensional movement. The displacement register 160 in the lower level and the working register 162 in lower level are loaded with the $\Delta 1$ displacement index parameter of the array transformation. In the example shown in FIG. 16 the working register 162 initially is loaded indirectly by the command interpreter 36 prior to going into execution mode with the index of point "1" as defined by a $\Delta 0$ in an array transformation. When a movement in the one dimension specified by the contents of the lower level displacement register 160 comes to an end (index 6 in FIG. 16) and when the length counter is negative then the following occurs: the displacement register 160 in the upper level of the same MAC 112 will contain the $\Delta 2$ displacement index of the array transformation required to move the current index of that level to the next linear sequence (i.e. from 1 to 7 in FIG. 16). The result, after being loaded back into the lower level working register 162 and validated, will be down-loaded into the lower level working register 162 of the MAC 112 and the length counter number (LCN) register 182 will be re-loaded from the contents of the length number (LN) register 180. The lower level of MAC 112 is then ready to once more complete a linear sequence from 7 to 12 in FIG. 16 as specified by the $\Delta 1$ displacement index parameter. This process corresponds to a two-dimensional address sequence since $\Delta 1$ and $\Delta 2$ will not be altered; also, this description can be extended to higher order address sequences up to four dimensions in the present embodiment. Each time a new dimension is invoked, transfer of data from an upper level to a lower level of MAC 110, 112 hardware is required. It is therefore a requirement of the MAC 110, 112 that each $\Delta 0$ working register 162 have access from the level above which includes upper MAC 110 to lower MAC 112 transfers.

Referring now to FIG. 16 and FIG. 17, the indexes 5, 6 and 12 as shown in FIG. 16 are said to be outside the input shape or "out of bounds." The occurrence of these indices will be handled differently depending on the boundary mode selected. Each level of MAC 110, 112 contains a length number register 180 which stores the length control word as shown in FIG. 4B. The length number register 180 is loadable from the CI 36 during initialization and one bit of this control word is allocated to boundary mode B. The two modes selectable via this bit are "wrap-around" and "zero-fill". Each invokes different system responses when the current index is out of bound (indicated by the boundary status bits). In zero-fill mode an out of bounds index is "valid" but the data obtained from memory will be substituted by zero. In a write port the data would simply not be written to memory. In wrap-around mode indices outside the boundary are regarded as invalid. It is a requirement in this mode that if a single displacement results in an index outside the input shape (matrix) it must be adjusted to point to an index inside the input shape. For index adjustment of the example shown in FIG. 17 to go from 24 to 19, it is required that the row length be subtracted from the column index. To go from 4 to 40 requires column length to be subtracted from the row index. In order to support this adjustment requirement, the MAC 110, 112 architecture allows the selective subtraction of the content of the boundary length registers 144, 145 in each level of the MAC 110, 112.

Referring now to FIG. 10, the MAC 110, 112 devices produce row and column indices representing offsets from an initial reference or starting point (Δ0) as specified in an array transformation. The Address Translator (AT) 114 together with the multiplier 118 converts this offset into a 30 bit address 130. In order to calculate this address, the AT 114 must know the base address, Δ0 (initial starting point), the row length (L1-L4 number of elements in a row), and the packing factor of the data element (number of bits that comprise the data element). These values are loaded into the AT 114 prior to current instruction execution by the command interpreter 36 via the A BUS 30. The AT 114 registers are doublebanked, allowing the command interpreter 36 to set up for the next instruction while the AT 114 is executing the current instruction.

The address translator 114 essentially converts a row index and column index identifying a location of data to a linear address to identify the location of the element of data. The AT 114 supplies the row length 139 to the multiplier 118, which then multiplies the row index 137 offset by the row length 139 and supplies the result back to the AT 114. The AT 114 adds this product with the column index 138 offset to obtain the total index offset from the initial starting point. The AT 114 converts this index offset to a physical offset by shifting the index offset by an amount equal to the packing factor effectively multiplying by the number of bits in the data element. This address offset is then added to the base address to obtain the 30 bit address for the data element. This 30-bit address 130 now points to the most significant bit of the data element to be accessed. An alternate path exists for generating Fast Fourier Transform (FFT) coefficient addresses. This path replaces row length by a column index (multiplier 167) and the sum of the product and column index by the product itself (which is the product of the row and column index). The product of the row and column index represents a linear offset into the linear table of complex exponentials stored in the ROM memory bank 60. The Digital Fourier Transform (DFT) coefficient matrix is shown in FIG. 18; it illustrates that the exponent of w is the product of the row and column index. Referring now to FIG. 3, the data formatter (DF) 104 may be implemented with two identical 180 pin, 2500 gate, CMOS gate arrays, each having a 32-bit slice and may be configured either as Read or Write data formatters. This configuration is controlled by hardwired connections. As a Read formatter, the data formatter 104 reads 64 bit packed data from the Memory banks 59, unpacks the data element, shifts and masks all unnecessary bits to zero, and presents to the AU 38 a left-justified data element. Shift amounts and mask parameters (i.e. packing factor etc.) were previously loaded into the data formatter 104 by the command interpreter 36. As in the address translator 114, data formatter 104 control registers are also double banked. All normalization calculations are performed by the command interpreter 36, which in turn informs the DF 104 of the results via the shift amount.

As a Write formatter, the data formatter 104 is presented left-justified data elements from the arithmetic unit 38. The data formatter 104 must perform a read-modify write operation, packing this new data element among the unchanged data elements of the 64 bit word in intelligent memory 12. The control circuitry of intelligent memory 12 is such that a read for the Read modify write occurs only if the 64 bit boundary has been crossed. This eliminates unnecessary memory reads by the write port.

Still referring to FIG. 3 there is shown the Memory Controller (MC) 102 which may be implemented with a 144 pin, 3500 gate, CMOS gate array and provides overall central control for the intelligent memory 12 pipeline. In addition, it provides interfaces to the command interpreter 36, arithmetic unit 38 and the arbitration and switching network 62.

The A BUS 30 interface of the memory controller 102 decodes the A BUS address, providing chip selects as required, and acts upon or distributes all A BUS control signals as required. The memory controller 102 also controls bidirectional buffers for the A BUS 30 data path. This method allows each intelligent memory 16-20 port to present only one load to the A BUS 30, and allows all decode circuitry to reside in one central location for each of said ports 16-20.

The AU interface supplies data ready and data request control lines to the arithmetic unit 38. These lines are used to control data flow between the AU 38 and an intelligent port 16, 18, 20. Based on the state of these control lines, the memory controller 102 has the ability to selectively start and stop the intelligent port pipeline as required.

The memory controller 102 also provides the intelligent ports interface to the arbitration and switching network 62. The memory controller 102 receives the 30 bit address 130 from the address generator 100, and decides if a memory access is necessary (if the 64 bit word boundary has been crossed). If a memory access is required, the memory controller 102 generates a 3 bit BANK REQUEST 93 code to the arbitration and switching network 62. The memory controller 102 then looks for the bank acknowledge 94 signal from the arbitration logic, stopping the intelligent port pipeline and notifying the arithmetic unit 38 if the port has lost memory arbitration. Thus the memory controller 102 controls the overall flow of data through the intelligent port pipeline, and between the intelligent port 16-20, the arithmetic unit 38 and the memory banks 52-60.

This concludes the description of the preferred embodiment. However, many modifications and alterations would be obvious to one of ordinary skill in the art without departing from the spirit and the scope of the inventive concept. For example, the number of RAM or ROM storage locations in the intelligent memory 12 may vary and the number of intelligent ports may vary depending on system applications. Also, the multiplier 118 in the address generator 100 could be removed if memory chips with two dimensional structures were available externally for row and column indices to index into directly instead of the current approach of producing a linear address displacement first and then breaking it down inside memory chips into row and column addresses. In this case, FFT coefficients could be generated by using variable "deltas" as provided for in duplex mode. In addition, the parameters of the array transformation and supporting hardware embodiment can be expanded to specify additional displacement sequences for arrays of higher rank. Therefore, it is intended that the scope of this invention be limited only by the appended claims.

TABLE 1

| Function | DISPLACEMENT FIELD Description |
|---|---|
| Z | Initialize the specified row and column registers to zero so that they point to upper left corner of the matrix. This results in zero displacement. |
| +i | Initialize the specified delta row register with zero, and the delta column register with one. This results in the movement across the row one point to the right. |
| +j | Initialize the specified delta row register with one, and the delta column register with zero. This results in the movement down the column one point. |
| +k | Initialize the specified delta row register with one and the delta column register with one. This results in a one point diagonal movement downward to the right. |
| P | Initialize the specified delta row register with zero and the delta column register with zero. This function also specifies that the row and column delta registers need data substitution prior to every round of execution. (Not applicable to Delta 1 and Delta 2 fields.) |
| −i | Initialize the delta row register with zero and the delta column register with negative one. Movement is one point to the left. |
| −j | Initialize the delta row register with neative one and the column register with zero. Movement is one point up the column. |
| −k | Initialize the delta row and column register with negative one. Movement is one point diagonally upward to the left. |

TABLE 2

| FUNCTION | LENGTH FIELD DEFINITION |
|---|---|
| 1 | Repeat as necessary to match a corresponding output array shape |
| I | Row length of input array |
| J | Column length of input array |
| S | Stop on boundary |
| NOP | Default option |
| NU | Not used |
| NU | Not used |

TABLE 3

| NAME | MODE FIELD DEFINITION |
|---|---|
| FSPX | Full Simplex Mode |
| DPXS | Duplex Mode Scalar |
| DPXV | Duplex Mode Vector |
| DPXM | Duplex Mode Matrix |
| HSPX | Half Simplex Mode |
| FDPXS | Flushed Duplex Mode Scalar |
| FDPXV | Flushed Duplex Mode Vector |
| FDPXM | Flushed Duplex Mode Matrix |

What is claimed is:

1. A method of generating addressing sequences for accessing a multidimensional array of data in a digital system comprising the steps of:
   interpreting instruction commands;
   performing arithmetic operations based on said commands;
   storing data used in said arithmetic operations in a memory means;
   generating addressing sequences specified by an array transformation of a high-level programming language in accordance with a nested series of a plurality of parameters of said array transformation, for serially accessing all elements of said data array;
   interpreting a boundary parameter of said array transformation for controlling the generating of said addressing sequences when an address of said sequence is generated outside a boundary of said array; and
   transferring said data between said memory means and arithmetic means performing said arithmetic operations as specified by said array transformation.

2. The method as recited in claim 1 wherein:
   said boundary parameter specifies a plurality of modes comprising a wrap-around mode, a zero-fill mode and an ignore boundaries mode.

3. A digital system comprising:
   means for interpreting instruction commands;
   means for performing arithmetic operations based on said commands;
   means for storing a multidimensional data array for said arithmetic operations, said storing means comprising means for generating a plurality of addressing sequences in response to an array transformation of a high-level programming language for serially accessing all elements of said data array;
   means for interpreting a boundary parameter of said array transformation for controlling the generating of said addressing sequences when an address of said sequences is generated outside a boundary of said array; and
   means for transferring said data between said storing means and said arithmetic means performing said arithmetic operations in accordance with said array transformation.

4. The digital system as recited in claim 3 wherein:
   said storing means comprises a port means for generating said plurality of addresses according to said array transformation.

5. The digital system as recited in claim 4 wherein:
   said port means comprises an address generator for generating said plurality of addresses to load or access said data array in said storing means.

6. The digital system as recited in claim 3 wherein:
   said array transformation specifies array addressing in terms of a factored series of nested addressing sequences defined by a plurality of displacement and length parameters.

7. The digital system as recited in claim 3 wherein:
   said boundary parameter interpreting means comprises a plurality of modes including a wrap-around mode, a zero-fill mode and an ignore boundaries mode.

8. A memory comprising:
   means for storing a multidimensional data array;
   a plurality of read/write port means, said port means comprises addressing means for transferring all elements of said data array to and from a bus means in accordance with serial addressing sequences specified by an array transformation of a high-level programming language;
   said addressing means comprises means for generating a plurality of multidimensional indices specified by said array transformation;

means for interpreting a boundary parameter of said array transformation for controlling the generating of said addressing sequences when an address of said sequences is generated outside a boundary of said array; and switching network and arbitration means coupled between said storing means and said port means for routing data transfers between said storing means and said port means.

9. The memory as recited in claim 8 wherein:

said port means comprises at least two intelligent ports for transferring said data to and from said arithmetic means.

10. The memory as recited in claim 9 wherein:

at least one of said intelligent ports operate in a read ode and at least one of said intelligent ports operates in a write mode.

11. The memory as recited in claim 8 wherein:

said storing means comprises at least one random access memory and at least one read only memory.

12. The memory as recited in claim 8 wherein:

said array transformation comprises a plurality of parameters for the generation of said addressing sequences for transferring said multidimensional data array to or from said memory, said array comprises a vector, a matrix or a block of data.

13. The memory as recited in claim 8 wherein:

said boundary parameter interpreting means comprises a plurality of modes including a wrap-around mode, a zero-fill mode and an ignore boundaries mode.

14. An intelligent memory comprising:

means for storing a multidimensional data array;

port means for transferring data to and from said memory in accordance with addressing sequences specified by an array transformation of a high-level programming language;

said port means comprises an address generator for generating said addressing sequences in response to a plurality of multidimensional indices for serially accessing said multidimensional data array as specified by said array transformation;

means for interpreting a boundary parameter of said array transformation for controlling the generating of said addressing sequences when an address of said sequences is generated outside a boundary of said array;

network means for coordinating data transfers between said plurality of port means and said storing means;

a data formatter for packing and unpacking data to and from said storing means; and a memory controller coupled to said address generator, said network means and said data formatter for controlling said data through said port means in accordance with said array transformation.

15. The intelligent memory as recited in claim 14 wherein:

said array transformation comprises a plurality of displacement and length parameters for generating said addressing sequences for storing or accessing said data array; and said array comprises a vector, a matrix or a block of data.

16. The intelligent memory as recited in claim 14 wherein:

said port means comprises at least three intelligent ports for transferring data to and from said memory, at least two of said ports operating in a read mode and at least one of said ports operating in a write mode; and said port means further comprises a direct memory access port for input-output data transfers.

17. The intelligent memory as recited in claim 14 wherein:

said storing means comprises at least one random access memory and at least one read-only memory.

18. The intelligent memory as recited in claim 14 wherein:

said boundary parameter interpreting means comprises a plurality of modes including a wrap-around mode, a zero-fill mode and an ignore boundaries mode.

* * * * *